Oct. 19, 1965

W. P. SOMERS 3,213,329

TEMPERTURE SENSOR SYSTEM

Filed April 30, 1963

Inventor:
William P. Somers,
by Lawrence R. Kempton
His Attorney

Oct. 19, 1965 — W. P. SOMERS — 3,213,329
TEMPERTURE SENSOR SYSTEM
Filed April 30, 1963 — 2 Sheets-Sheet 2

Inventor:
William P. Somers,
by Lawrence R. Kempton
His Attorney

United States Patent Office 3,213,329
Patented Oct. 19, 1965

3,213,329
TEMPERATURE SENSOR SYSTEM
William P. Somers, Cheshire, Conn., assignor to General Electric Company, a corporation of New York
Filed Apr. 30, 1963, Ser. No. 276,932
10 Claims. (Cl. 317—132)

This invention relates to temperature sensor systems and in particular to such systems operating on alternating electrical current for controlling over-temperature conditions in electrically operated apparatus.

It is often desirable to provide a protective means or safety control in conjunction with electrically operated heat generating apparatus to discontinue energization of the apparatus when an abnormally high temperature is produced therein. Furthermore, it is often necessary that such control systems have a high degree of sensitivity to insure deenergization of the electrical load within a narrow range of load temperature. This is particularly true in the case of electrically heated appliances intended for home use, such as electrical bedcovers.

Electrically actuated circuit control devices, such as relays, are commonly used for control of load circuits responsive to signals from a sensor. When the relay coil and its associated temperature sensitive circuit are operated on alternating current power, certain additional problems are presented. For example, the noise or hum created by the use of an alternating current relay in alternating current control circuits is often unsuitable for use in home appliances, and this is especially troublesome when the current approaches the value at which the relay opens the load circuit. Furthermore, sensitive alternating current relays have been found to be relatively more expensive to manufacture than direct current relays of equal sensitivity.

While it is thus undesirable in some respects to provide alternating current operation of circuit control elements, adequate sensitivity and long term reliability can only be obtained in certain temperature sensing systems through the application of alternating voltage to the temperature sensitive medium. For example, various plastic insulating compounds, having an ionic compound added thereto, provide a material having a negative thermal coefficient of impedance. Although such materials provide a low cost, highly sensitive, flexible material for temperature detection, the temperature responsive characteristics of the material have been found to be affected adversely by the application of direct current.

One object of my invention is to provide an improved alternating current sensor system which is capable of highly sensitive control of the temperature of an electrically operated load.

It is a further object of this invention to provide a reliable temperature sensor system having long life and exhibiting quiet operation.

It is yet another object of this invention to provide a temperature sensor system capable of spot detection of an over-temperature condition in an electrical apparatus of relatively large areas for immediate deenergization of the apparatus upon the occurrence of such an over-temperature condition.

In carrying out the objects of my invention in one form thereof, I provide an alternating current temperature sensing system, including a control circuit which is responsive to an over-temperature condition in a heat generating load to open a switch in the electrical circuit of the load. The load circuit switch is operated by a direct current relay having a coil which is connected in parallel with a unidirectionally conducting circuit element to provide direct current flow through the coil during the predominant portion of a complete cycle of the applied alternating current. A temperature sensor having a relatively high impedance at normal operating temperatures and a lower impedance at abnormally high temperatures is also connected in parallel with the relay coil. Thus, the sensor exhibits an insulating characteristic during normal operation and is capable of conducting current of control magnitude between conductors 21 and 22 at over-temperature conditions. A symmetrical electrical impedance is connected in series with the relay coil and the temperature sensor to provide an increased line voltage drop when the sensor is conducting. The increased line voltage drop reduces the voltage across the relay coil sufficiently to deenergize the relay thereby opening the switch of the electrical load. The sensor may comprise a continuous cable assembly including a pair of closely spaced conductors separated by a thin layer of plastic insulating compound containing an ionic additive.

Thus the alternating current temperature sensor system of this invention insures that the control relay of the system operates on direct current, thereby maintaining consistent temperature sensitivity over a long life, and at the same time, quiet relay operation.

Other objects and advantages of my invention may best be understood by reference to the following description taken in connection with the accompanying drawings in which.

Figure 4:
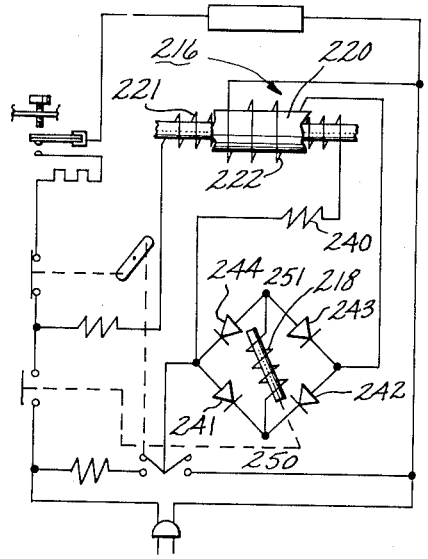
Figure 5:
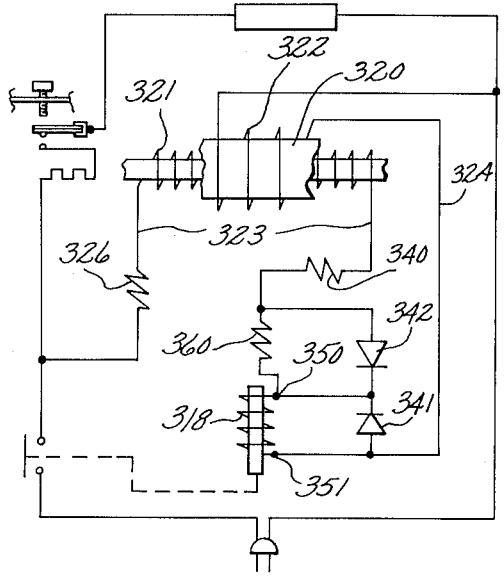
Figure 6:
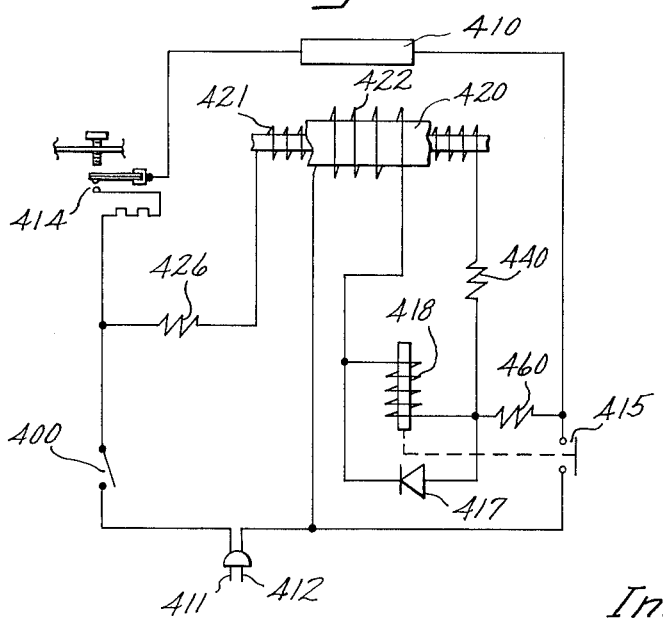

FIGS. 4 and 5 are diagrammatic views of various forms of this invention embodying different arrangements of unidirectional circuit elements to provide that only alternating voltage be applied to the temperature sensitive material; and FIG. 6 is a diagrammatic view of one form of this invention wherein the load circuit is automatically reenergized upon the reduction of the temperature of the load below a dangerous over-temperature condition.

Figure 1:
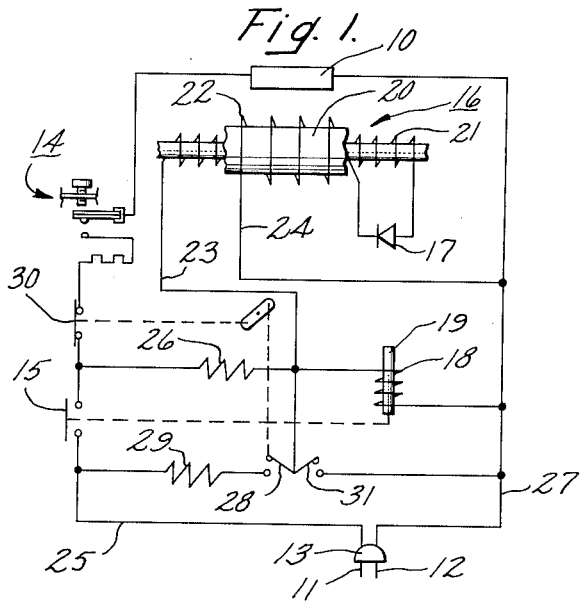
FIG. 1 is a diagrammatic view of one form of the invention using a double wrap temperature sensor assembly of the above-mentioned type.

FIG. 1 shows the alternating current sensor system of this invention in one form, associated with a load circuit having heat generating means or apparatus 10 connected therein. The load 10, typically the heater of an electric bedcover, is electrically connected across the terminals 11 and 12 of a plug 13 which is adapted to be connected to an alternating current power source. An ambient responsive control assembly 14, of a well known type, may be connected in the load circuit, in order to regulate the percent of "on" time of the electric heater in accordance with a manual setting and the ambient room temperature. This type of control permits the user to select the average temperature of normal operation by cycling the heating means.

Under normal operations of the load, a relay switch 15 remains closed, permitting control of the current flow to heating means 10 by ambient responsive assembly 14. However, should an over-temperature condition exist, it is necessary to have a control system which is responsive to such a condition at any spot or small portion of load 10 to interrupt further flow of current to the load. It is for this reason that the control portion of the circuit of FIG. 1 is used.

The control circuit includes a temperature sensor assembly 16, a unidirectional circuit element or rectifier 17, and a relay having a coil 18 wound on a core 19 to actuate relay switch 15 magnetically. While the circuit shown in FIG. 1 and FIGS. 3–5 show the control circuit electrically connected to the load circuit, this is merely done by way of example and the control circuit may be electrically separated from the load circuit.

The purpose of temperature sensor assembly 16 is to provide impedance layer 20 of thermosensitive material responsive to the temperature of load 10 and having a marked temperature responsive change in impedance, in parallel with relay coil 18. In the illustrated example, impedance layer 20 acts essentially as an insulator between conductors 21 and 22 during normal operating temperatures but when heated to an abnormal temperature, it is capable of conducting current of control magnitude between conductors 21 and 22. Where a flexible layer is desired, as a material for impedance layer 20, such base materials as nylon, arcylonitriles and similar plastic compounds may be used with or without suitable ionic additive. In practice, I have found that polyvinyl chloride is suitable for this purpose when combined with an appropriate plasticizer and ionic additive as fully disclosed in copending application Serial No. 276,931, W. H. Gordon, filed April 30, 1963 and assigned to the General Electric Company. It is to be understood, however, that any material or device having a negative thermal coefficient of impedance and being of suitable form may be connected in parallel across relay coil 18.

Preferably, impedance layer 20 is arranged within a sensor wire assembly, as shown diagrammatically in FIGS. 1 and 3–6, between an inner wrap or conductor 21 and an outer wrap or conductor 22. This arrangement is particularly desirable for the detection of over-temperature conditions of a heating means having a large area.

Figure 2:
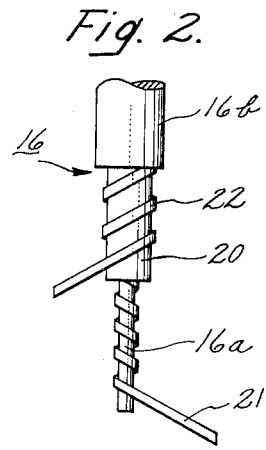
FIG. 2 is a fragmentary view showing the construction of a typical temperature sensor assembly which may be used with this invention.

By way of example, one construction of the preferable embodiment of temperature sensor assembly 16 is shown in FIG. 2, having an inner core 16a of glass or rayon fibers or some equivalent insulating material. A flattened wire wrap 21 having reasonably good electrical conductivity is applied to core 16a and comprises the first or inner conductor of the sensor assembly. A relatively thin layer of the above-mentioned temperature sensing material is then extruded over the combined core and inner wrap 21 to provide layer 20. Conductor 22 is next wrapped around the outside of temperature sensing layer 20. An outer insulating jacket 16b may then be applied in the usual manner. It should be noted that constructions other than the concentric, spiraled, conductors 21 and 22 may be used. It is only essential to use two conductors in contact with and separated by a relatively thin layer of thermosensitive material having a negative coefficient of impedance.

The relay of FIG. 1 is of the direct current type and is designed for high sensitivity. Relay switch 15 is normally open, i.e when coil 18 is de-energized, and upon energization of relay coil 18, switch 15 is maintained closed magnetically with core 19. When the temperature control circuit is operating, the relay is energized from terminal 11, through conductor 25, relay switch 15, a current limiting or dropping impedance 26, coil 18, and conductor 27, to power terminal 12.

In FIG. 1, rectifier 17 is connected across the terminals of relay coil 18 in a closed circuit from the upper relay coil terminal, through conductor 23, inner wrap 21 of the sensor assembly, rectifier 17, outer wrap 22, and conductor 24 to the lower relay coil terminal. During one-half of the alternating current cycle, when the rectifier 17 blocks current flow, the current from the power source is through the relay coil, while during the alternate half cycle, rectifier 17 provides a low resistance path to divert the power source current through itself and also permits relay coil current to continue to flow in the same direction as induced by electromagnetic effects that is, it provides a low resistance return path for current produced in the coil by the inductive reaction of the coil to the decaying current from the source. Thus, in this circuit, current flow in the relay coil does not reverse with the alternating current cycle. It can be demonstrated with an oscilloscope that current flows unidirectionally through coil 18 during more than 70% or 252° of the 360° alternating current cycle when 60 cycle power is applied to the terminals 11 and 12. Thus, by placing a unidirectional circuit element 17 in parallel with coil 18, the noise associated with alternating current relays has been substantially eliminated, and the need for an electrical capacitance in parallel with the coil has been eliminated.

Should an over-temperature condition exist, it can be seen that flow of current through impedance layer 20 between conductors 21 and 22 at any point along the sensor assembly, will bypass or short-circuit relay coil 18 and rectifier 17. This will result in a greatly reduced current through relay coil 18, causing relay switch 15 to open. In addition to limiting the current, impedance 26 also provides an increase voltage drop when layer 20, is conducting to thereby reduce the voltage across coil 18. Impedance 26, for this purpose is preferably a device such as a resistor which conducts current equally well in both directions. It is therefore referred to herein as a symmetrical electrical impedance.

The circuit of FIG. 1 has been found to operate satisfactorily when the value of impedance 26 is 100,000 ohms, coil 18 has 10,000 turns and an impedance of 2500 ohms and layer 20 has an impedance of 65,000 ohms upon relay deenergization.

While it is possible to mechanically close relay switch 15 and there are various ways in which the relay coil 18 could be initially energized to close relay switch 15, it is preferred to energize the coil electrically by means of an "on" switch 28 which is connected in series with relay coil 18 and a current limiting "start" impedance 29. Thus upon the closing of "on" switch 28, relay coil 18 is energized through a circuit commencing with terminal 11, through conductor 25, "start" impedance 29, the "on" switch, coil 18 and conductor 27 to terminal 12. The "start" impedance 29, having a value of approximately 10,000 ohms, protects the circuit against an excess of current flow, while allowing sufficient current to flow through relay coil 18 to cause the initial pickup of the relay.

The "on" switch, which is preferably of the momentary depression, spring returned type, is mechanically connected to a safety switch 30 to open the normally closed saftey switch whenever the "on" switch is depressed. As the safety switch is connected in the load circuit of load apparatus 10, the load remains deenergized until the "on" switch is released. Thus, this safety feature prevents a user from defeating or bypassing the temperature sensing control circuit by jamming the "on" switch closed. Of course, once relay coil 18 is energized it remains energized as discussed above; and there is no necessity to maintain "on" switch 28 in the closed position.

The control circuit may be deenergized manually or through the use of a spring returned momentary "off" switch 31 which I prefer for electrically deenergizing coil 18. "Off" switch 30 provides a shunt path around coil 18 between impedance 26 and conductor 27. Thus, the closing of the "off" switch essentially eliminates all voltage across relay coil 18, which releases switch 15 to its open position.

Figure 3:
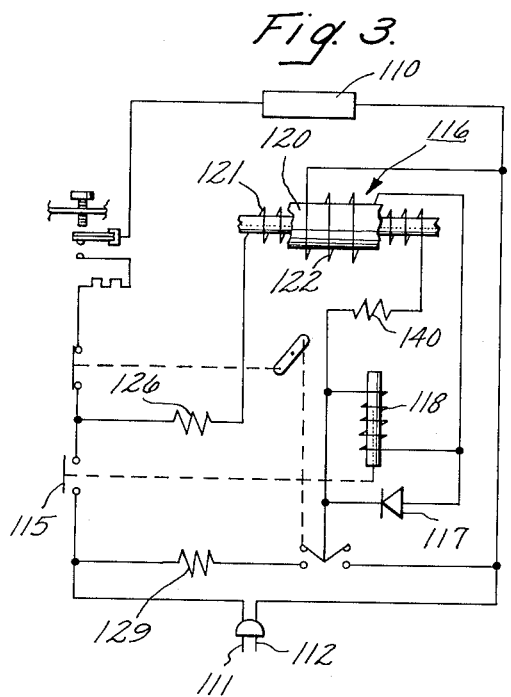
FIG. 3 is a diagrammatic view of another form of my invention.

An improved temperature sensitivity is obtained with the circuit shown in FIG. 3. This circuit differs from FIG. 1 by placing its relay coil 118 in series with the sensor conductors 121 and 122, and by the addition of an impedance matching resistor 140. The remaining elements of FIG. 3 are similar to those of FIG. 1. It should be noted that in FIG. 3 as in FIG. 1, the relay coil, the rectifier, and sensor layer are in electrical parallel to one another. Upon the existence of an over-temperature condition in load 110, the decreased impedance of layer 120 provides a current path between conductors 121 and 122 in parallel with relay coil 118. The additional flow of current through layer 120 results in an increased voltage drop across resistor 126, which reduces the voltage across relay coil 118, thereby opening relay switch 115. It is to be understood that the control circuit of FIG. 3 is designed to open the load circuit when the impedance of layer 120 has decreased to a certain value, for example, approximately 70,000 ohms.

Rectifier 117 acts in a manner similar to rectifier 17 of FIG. 1 to provide essentially direct current operation of the relay. An advantage of the FIG. 3 circuit over that of FIG. 1 is that any break in conductors 121 or 122 will remove all electrical current, A.C. and D.C., from relay coil 118. A similar break in the circuit of FIG. 1 will allow a continued flow of alternating current to the coil.

It has been found that by choosing a value for impedance matching resistor 140, such that when added to the impedance of coil 118 the sum is approximately equal to the impedance of layer 120 at relay drop-out, an optimum circuit control results. This relationship maximizes the relative reduction in relay coil current when an overheat condition exists. A circuit as shown in FIG. 3, having the following valued elements, has operated satisfactorily: dropping impedance 126—82,000 ohms, matching impedance 140—68,000 ohms, layer 120—drop-out value—70,000 ohms and coil 118—18,000 turns and 5,000 ohms.

Impedance matching resistor 140 has been herein shown and described as a fixed resistor of consistent resistance value. Resistor 140 could, however, be a gas discharge lamp or neon glow lamp which is electrically conductive down to a certain voltage level and then non-conductive at lower voltages. In other words resistor 140 may be non-linear, and cease conducting when the voltage across it reaches the desired critical drop-out level. It should be understood that other types of electrical impedances such as capacitors or inductances can be used in place of any or all of the resistors 126, 140, and 129.

When circuits similar to those shown in FIGS. 1 and 3 are used, having a single rectifier therein, a small component of direct current voltage appears across the sensor layer. It appears from laboratory experiments that when sensor layers of plastic material having ionic additives, such as some of those mentioned above, are used, direct current voltage across the layer causes a migration of the ionic material to the inner and outer peripheries of the layer. The ionic migration causes a drift or variation in the impedance of the layer with time, thereby greatly reducing the sensitivity of the sensor. To remove substantially all of the direct current voltage from the sensor layer, a plurality of rectifiers as shown in FIGS. 4 and 5 may be used.

FIG. 4 is identical to FIG. 3 with the exception that a traditional full wave rectifying bridge, having a relay coil 218 connected across its output, replaces the coil 118 and the half-wave rectifier 117 of FIG. 3. During one-half of the alternating current cycle, when current is flowing through the sensor from inner wrap 221 to outer wrap 222 current flows from wrap 221 through resistor 240 and through rectifier 241 to point 250, and from point 250 through the relay coil 218 to point 251, and then through rectifier 243 to outer wrap 222. During this half cycle, rectifier 242 and 244 are non-conducting. During the other half of the alternating current cycle, the current flows from wrap 222 through rectifier 242 to point 250 and from there through coil 218 to point 251 and then through rectifier 244 and resistor 240 to inner wrap 221. Similarly, on this half cycle, rectifiers 241 and 243 are blocking or non-conducting. Thus, it can be seen that the current through coil 218 is flowing in the same direction from point 250 to point 251 during both halves of the alternating current cycle. At the same time, no direct current is applied to the sensor material.

Although the full-wave bridge arrangement of FIG. 4 provides the desired results, i.e., the application of direct current to the relay coil and the elimination of direct current voltage from the sensor layer, the incorporation of four single-cell rectifiers involves an expensive design. Furthermore, the failure of any one of the four rectifiers will apply a direct current voltage across the sensor layer 220, and the user may not be aware of the defect.

One circuit which reduces the disadvantageous characteristics of the control circuit of FIG. 4, while retaining the desired results, is shown in FIG. 5. In this FIG. 5 circuit, a rectifier cell 341 is connected across the relay coil for operation as previously described in connection with FIG. 3. However, in accordance with FIG. 5, a small impedance 360 is added in series with the relay coil; and connected across impedance 360 is a rectifier 342 oriented in the opposite electrical direction to rectifier 342. The use of impedance 360 and rectifier 342 balances out the small D.-C. component which would otherwise appear across the temperature sensing layer.

Continuing with FIG. 5, during one half of the alternating current cycle, current flows through inner sensor wrap 321, matching impedance 340, rectifier 342 (being shunted around impedance 360) and coil 318 to conductor 324. During the opposite half of the cycle, current flows from outer sensor wrap 322 to conductor 324, through rectifier 341 (being shunted around coil 318), impedance 360 and matching impedance 340 to wrap 321. Therefore, current flows through coil 318 only in the direction from coil terminal 350 to terminal 351, and only alternating voltage appears across sensor layer 320. The desired results have been obtained using a control circuit as shown in FIG. 5 wherein the circuit elements have the following values: dropping resistor 326—68,000 ohms; matching impedance 340—33,000 ohms; resistor 360—4,700 ohms; coil 318—1,500 ohms, having 6,500 turns and layer 320—60,000 ohms at relay drop out. These values assume an aplied alternating current voltage of 115 volts.

The control circuits shown in FIGS. 1 and 3–5 all are designed to open the load and control circuits upon the existence of an over-temperature condition so that the circuits will remain open until the circuits are again energized by the user, as through a manually operated "on" switch. Under some circumstances it may be desirable to provide a circuit which will automatically be reenergized upon the decrease of the temperature of the heating generating means below its over-temperature or dangerous condition. Such a circuit is shown in FIG. 6.

In FIG. 6 the spring returned "on" and "off" switch arrangements of the previous control systems are replaced by a toggle switch 400, the position of relay switch 415 is changed, and a resistor 460 is added. In other respects the circuit is similar to that of FIG. 3. When toggle switch 400 is closed, assuming that ambient responsive control assembly 414 is open, the control circuit through relay coil 418 is traced from terminal 411, through toggle switch 400, voltage dropping resistor 426, sensor conductor 421, matching impedance 440, relay coil 418, and sensor conductor 422 to terminal 412. The value of the circuit elements however, are designed to insure that under such circumstances, the current flowing through relay coil 418 is not sufficient to close switch 415.

Upon the closing of the ambient responsive control assembly 414 to permit the flow of current through load 410, a second circuit is closed through coil 418. This second relay coil circuit is traced from terminal 411 through toggle switch 400, control assembly 414, load 410, resistor 460, coil 418, and sensor conductor 422 to terminal 412. The additional current flow through this second relay coil circuit is controlled by the value of the circuit elements to now insure a closing of the relay switch 415. When switch 415 is closed, the circuit through load 410 is shunted around resistor 460 to reduce the energization of coil 418 and thereby prepare it for drop out of the relay switch when an overheat condition occurs in the load. Upon conduction through layer 420 resulting from an abnormally high temperature, a greater proportion of line voltage appears across resistor 426, and less across the relay coil; whereupon the relay releases and switch 415 opens.

As soon as load 410 and layer 420 cool, the voltage drop across dropping resistor 426 is reduced and the relay coil is sufficiently energized through the above mentioned two circuits to close the switch 415, thereby re-energizing the load circuit. Of course, rectifier 417 may be replaced with the multiple rectifier arrangement shown in FIGS. 4 and 5 to substantially eliminate the direct current voltage across the sensor material 420.

To provide the desired circuit operation of FIG. 6, the following circuit element values have been found satisfactory: dropping resistor 426—47,000 ohms; matching impedance 440—47,000 ohms; resistor 460—33,000 ohm; relay 418—5,000 ohms, and 18,000 turns with the impedance of load 410 set at approximately 85 ohms. These values are given only by way of example, and the values of the various circuit elements may be varied to obtain the desired results with the use of a heating means having widely different impedances.

I have thus described alternating current control systems for a heating means in which a temperature sensing assembly may be operated on alternating current, while the electromagnetically operated load switch is controlled essentially by direct current. While the invention has been described with specific examples, it is the aim of the appended claims to cover all such equivalent variations as come within the true spirit and scope of the foregoing disclosure.

What I claim is:
1. In a temperature sensor system for an electrically operated load adapted for energization from an alternating current source:
   (a) a relay including a coil;
   (b) a temperature sensor comprising a pair of conductors in contact with and separated by a thermosensitive layer having a relatively high impedance at normal operating temperatures and a lower impedance at abnormally high temperatures, said conductors being in a series circuit with said relay coil and said relay coil being in electrical parallel with said layer, said layer being subject to heat generated by said load;
   (c) means responsive to the operation of the relay to energize and de-energize said load;
   (d) a symmetrical electrical impedance in series with both said relay coil and said thermosensitive layer;
   (e) at least one unidirectional circuit element in parallel with said relay coil to provide unidirectional current flow through said relay coil during the major portion of a complete alternating voltage cycle; and
   (f) means connecting said series connected symmetrical impedance and relay coil across a source of alternating current power so that said coil is de-energized sufficiently to cause its operation with improved sensitivity in response to reduction of impedance of said layer due to an abnormally high temperature of said load.

2. A temperature sensor system as recited in claim 1 wherein one of said conductors is covered with said thermosensitive layer and wherein the other of said conductors is wound about said layer in concentric relationship to said one conductor.

3. In a temperature sensor system for an electrically operated load adapted for energization from an alternating current source:
   (a) a relay coil and load control contacts operated thereby;
   (b) a temperature sensor comprising a pair of conductors in contact with and separated by a thermosensitive layer subject to heat generated by said load having a relatively high impedance at normal operating temperatures and a lower impedance at abnormally high temperatures, said conductors being connected in series circuit with one another and said layer being connected to said relay coil in electrical parallel;
   (c) a symmetrical electrical impedance in series with both said relay coil and said conductors;
   (d) at least one unidirectional circuit element electrically connected in series between said conductors to provide unidirectional current flow through said relay coil during the major portion of a complete alternating voltage cycle; and
   (e) means for connecting said series connected symmertical impedance and said relay coil across the source of alternating current so that said coil is de-energized sufficiently to cause its operation with improved sensitivity in response to reduction of impedance of said layer due to abnormally high temperature of said load.

4. In a temperature sensor system for an electrically operated load adapted for energization from an alternating current source:
   (a) a relay coil and load control contracts operated thereby;
   (b) a temperature sensor comprising a pair of conductors in contact with and separated by a thermosensitive layer subject to heat generated by said load having a relatively high impedance at normal operating temperatures and a lower impedance at abnormally high temperatures, said relay coil being connected between said pair of conductors in electrical series therewith;
   (c) an electrical impedance in series with said conductors and said coil;
   (d) a unidirectional circuit element connected in parallel with said relay coil to provide unidirectional current flow through said coil during the major portion of a complete alternating voltage cycle; and
   (e) means for connecting said series connected symmetrical impedance, sensor conductors and relay coil across the source of alternating current so that said relay coil is sufficiently de-energized to cause its operation with improved sensitivity in response to reduction of impedance of said layer due to abnormally high temperature of said load.

5. In a temperature sensor system for an electrically operated load adapted for energization from an alternating current source:
   (a) first and second power terminals adapted to be connected to the source of alternating current;
   (b) a symmetrical electrical impedance having one terminal connected to said first power terminal;
   (c) a relay coil and load control contacts operated thereby, said relay coil having first and second terminals;
   (d) a temperature sensor responsive to the temperature of the load comprising a pair of conductors in contact with and separated by a thermosensitive layer having a relatively high impedance at normal operating temperatures and a lower impedance at abnormally high temperatures;
   (e) means for connecting one of said conductors between the other terminal of said symmetrical impedance and said first terminal of said relay coil;
   (f) means for connecting the other of said conductors between said second terminal of said relay coil and said second power terminal; and
   (g) at least one unidirectional circuit element in parallel with said relay coil to provide unidirectional current flow through said relay coil during the major portion of a complete alternating voltage cycle;
   (h) said coil being sufficiently de-energized to cause its operation with improved sensitivity in response to reduction of impedance of said layer due to abnormally high temperature of said load.

6. The temperature sensor system recited in claim 1 wherein a matching impedance is connected in series between said relay coil and one of said sensor conductors and wherein the sum of the values of said matching impedance and said relay coil is substantially equal to the magnitude of impedance of said sensor layer at said abnormally high temperature at which the current in said relay coil is such as to deenergize said load.

7. In a temperature sensor system for an electrically operated load adapted for energization from an alternating current source:
   (a) a temperature sensor including a thermosensitive layer subject to heat generated by said load having a relatively high impedance at normal operating temperatures and a lower impedance at abnormally high temperatures;
   (b) a full wave rectifier bridge connected in electric parallel to said sensor;
   (c) a symmetrical electrical impedance in series with both said sensor and said rectifier bridge;
   (d) a relay coil and load control contacts operated thereby, said relay coil being connected across the output of said rectifier bridge so that only unidirectional current flows through said coil; and
   (e) means for connecting said series connected symmetrical impedance and rectifier bridge across a source of alternating current so that upon energization of said system no direct current voltage appears across the sensor layer.

8. In a temperature sensor system for an electrically operated load adapted for energization from an alternating current source:
   (a) a relay coil and load control contacts operated thereby;
   (b) a temperature sensor including a thermosensitive layer subject to heat generated by said load in electrical parallel with said relay coil having a relatively high impedance at normal operating temperatures and a lower impedance at abnormally high temperatures;
   (c) a symmetrical electrical dropping impedance in series with both said relay coil and said sensor;
   (d) means for providing unidirectional current flow through said relay coil including:
      (aa) a first unidirectional circuit element in parallel with said coil;
      (bb) a control impedance in series circuit with said relay coil and said unidirectional element and
      (cc) a second reversely connected unidirectional circuit element in parallel with said control impedance and in series with said relay coil; and
   (e) means for connecting said series connected symmetrical impedance, relay coil and unidirectional current flow means across said source of alternating current.

9. An alternating current temperature sensor system comprising:
   (a) a relay coil and load control contacts operated thereby;
   (b) a temperature sensor in electrical parallel with said relay coil having relatively high impedance at normal operating temperatures and a lower impedance at abnormally high temperatures;
   (c) a symmetrical electrical impedance in series with both of said relay coil and said sensor;
   (d) at least one unidirectional circuit element in parallel with said relay coil to provide unidirectional current flow through said relay coil during the major portion of a complete alternating voltage cycle;
   (e) means connecting said series connected symmetrical impedance and relay coil across a source of alternating current power to provide a first relay circuit;
   (f) an electrical load connected across said source in parallel with said symmetrical impedance and in series with said relay coil to provide a second relay circuit;
   (g) a control impedance connected between said electrical load and said coil in said second relay circuit; and
   (h) means for connecting said load control contacts in shunt around said control impedance and said coil whereby upon energization of said system sufficient current flows through said relay circuits to energize said relay coil for operation of said load control contacts, the current flowing in said first relay circuit being sufficient to maintain operation of said control contacts but insufficient to initiate operation thereof.

10. In a temperature sensor system for an electrically operated load adapted for energization from an alternating current source:
    (a) a relay coil and load control contacts operated thereby;
    (b) a temperature sensor responsive to the temperature of the load and comprising a pair of conductors in contact with and separated by a thermosensitive layer having a relatively high impedance at normal operating temperatures and a lower impedance at abnormally high temperatures, said conductors being in a series circuit with said relay coil, and said relay coil being in electrical parallel with said layer;
    (c) a symmetrical electrical impedance in series with both said relay coil and said thermosensitive layer;
    (d) a unidirectional circuit element in parallel with said relay coil to provide essentially unidirectional current flow through said relay coil and resulting in a direct current component on said thermosensitive layer;
    (e) electrical circuit means including at least one additional unidirectional circuit element reversely connected to counterbalance the direct current component on said thermosensitive layer; and
    (f) means for connecting said series connected symmetrical impedance and relay coil across said source of alternating current.

References Cited by the Examiner
UNITED STATES PATENTS

| | | | |
|---|---|---|---|
| 2,565,478 | 8/51 | Crowley | 317—132 X |
| 2,768,274 | 10/56 | Estes | 317—132 |
| 2,846,560 | 8/58 | Jacoby et al. | 219—542 X |
| 2,874,337 | 2/59 | Sorenson | 317—147 X |
| 2,882,456 | 4/59 | Koch | 317—147 X |
| 2,897,413 | 7/59 | Hodges | 317—156 X |
| 2,987,654 | 6/61 | Voss | 317—155.5 X |
| 3,083,319 | 3/63 | Tiemann | 317—41 X |
| 3,114,820 | 12/63 | Holmes | 219—494 X |

SAMUEL BERNSTEIN, *Primary Examiner.*